US011689352B2

(12) United States Patent
Anderson

(10) Patent No.: US 11,689,352 B2
(45) Date of Patent: Jun. 27, 2023

(54) STRONG WHITE-BOX CRYPTOGRAPHY

(71) Applicant: ARRIS Enterprises LLC, Suwanee, GA (US)

(72) Inventor: Lex Aaron Anderson, Auckland (NZ)

(73) Assignee: ARRIS Enterprises LLC, Suwanee, GA (US)

( * ) Notice: Subject to any disclaimer, the term of this patent is extended or adjusted under 35 U.S.C. 154(b) by 111 days.

(21) Appl. No.: 15/839,266

(22) Filed: Dec. 12, 2017

(65) Prior Publication Data

US 2018/0167197 A1 Jun. 14, 2018

Related U.S. Application Data

(60) Provisional application No. 62/432,830, filed on Dec. 12, 2016.

(51) Int. Cl.
*H04L 9/00* (2022.01)
*H04L 9/06* (2006.01)

(52) U.S. Cl.
CPC .............. *H04L 9/002* (2013.01); *H04L 9/06* (2013.01); *H04L 9/0631* (2013.01); *H04L 2209/16* (2013.01)

(58) Field of Classification Search
CPC .................................................. H04L 2209/16
See application file for complete search history.

(56) References Cited

U.S. PATENT DOCUMENTS

| | | | | |
|---|---|---|---|---|
| 2004/0139416 | A1* | 7/2004 | Riedel | G06F 30/327 |
| | | | | 716/104 |
| 2017/0024585 | A1* | 1/2017 | Mooij | G06F 21/72 |
| 2017/0126398 | A1* | 5/2017 | Wiener | H04L 9/0631 |
| 2017/0324547 | A1* | 11/2017 | Drexler | G09C 1/00 |
| 2017/0373838 | A1* | 12/2017 | Wurcker | G09C 1/00 |

OTHER PUBLICATIONS

Norman, Kenneth E., "Algorithms for White-box Obfuscation Using Randomized Subcircuit Selection and Replacement", Mar. 27, 2008, Air Force Institute of Technology (pp. 1-2, 25, and 32-43) (Year: 2008).*

(Continued)

*Primary Examiner* — Benjamin E Lanier
(74) *Attorney, Agent, or Firm* — Chernoff, Vilhauer, McClung & Stenzel, LLP

(57) ABSTRACT

A method is provided for generating an output from an input according to a secret using a white-box implementation of a cryptographic function having a first operation, a second operation, and a third operation. The method applies the input to a first operation to generate a first intermediate result, applies the first intermediate result to a second operation to generate a second intermediate result, and applies the second intermediate result to a third operation to generate the output, wherein at least two of the first operation, the second operation, and the third operation is implemented by a plurality of interconnected logic elements, the interconnection of the plurality of logic elements being comprised of one of a non-algebraic interconnection of logic elements and an algebraic interconnection of logic elements having obfuscated boundaries between the at least one of the first operation, the second operation and the third operation.

13 Claims, 13 Drawing Sheets

(56) References Cited

OTHER PUBLICATIONS

Bourn, Dominique et al., "Approximate Mal'Tsev Operations", Theory and Applications of Categories, vol. 21, No. 8, 2008, pp. 152-171. (Year: 2008).*

Neiroukh et al., "Transforming Cyclic Circuits Into Acyclic Equivalents," Oct. 2008, IEEE Transactions on Computer-Aided Design of Integrated Circuits and Systems, vol. 27, No. 10, pp. 1775-1776 (Year: 2008).*

Zhou et al., "CycSAT: SAT-Based Attack on Cyclic Logic Encryptions," 2017 IEEE/ACM International Conference on Computer-Aided Design (ICCAD), pp. 49-56 (Year: 2017).*

Gange et al., "Four-Valued Reasoning and Cyclic Circuits," Jul. 2014, IEEE Transactions on Computer-Aided Design of Integrated Circuits and Systems, vol. 33, Issue: 7, p. 1003 (Year: 2014).*

PCT International Search Report & Written Opinion, RE: Application No. PCT/US2017/065860, dated Oct. 17, 2018.

K. Shamsi, et al., "Cyclic Obfuscation for Creating SAT-Unresolvable Circuits", Great Lakes Symposium on VLSI 2017, May 10, 2017, pp. 173-178.

V. A. Bespalov, et al.,"The obfuscation method of digital circuits based on the use of logical implications" Russian Mircoelectronics, vol. 41, No. 7, Nov. 7, 2012, pp. 415-418.

J. Parham, "Component Hiding Using Identification and Boundary Blurring Techniques", Mar. 1, 2010, retrieved from the Internet on Sep. 28, 2018: URL:http://www.dtic.mil/dtic/tr/fulltext/u2/a517004.pdf.

N. Balabanian, et al., "Switching Algebra and Logic Gates", in "Digital Logic Design Principles", Nov. 1, 2000, pp. 34-80.

S. Banescu, et al., "A framework for measuring software obfuscation resilience against automated attacks". In Software Protection (SPRO), 2015 IEEE/ACM 1st International Workshop on, pp. 45-51. IEEE, 2015.

O. Billet, et al., "Cryptanalysis of a white box AES implementation". In Selected Areas in Cryptography, vol. 3357, pp. 227-240. Springer, 2005.

A. Biryukov, et al., "Cryptographic schemes based on the ASASA structure: Black-box, white-box, and public-key". Advances in Cryptology—. . . , 2014. URL http://link.springer.com/chapter/10.1007/978-3-662-45611-8{_}4.

J. Bos, et al., "Differential Computation Analysis : Hiding your White-Box Designs is Not Enough". Cryptology ePrint Archive: Report 2015/753, pp. 1-22, 2015. URL https: //eprint.iacr.org/2015/753.

S. Chow, et al., "White-Box Cryptography and an AES Implementation". In Selected Areas in Cryptography, pp. 250-270. Springer, 2003. ISBN 3-540-00622-2. doi: 10.1007/3-540-36492-7_17.

J. Cong, et al., "Large scale circuit partitioning with loose/stable net removal and\nsignal flow based clustering". Computer-Aided Design, 1997. Digest of Technical Papers., 1997 IEEE/ACM International Conference on, (i), 1997. ISSN 1092-3152. doi: 10.1109/ICCAD.1997.643573.

Y. De Mulder, et al., "Cryptanalysis of a pertur-bated white-box AES implementation". Progress in Cryptology-INDOCRYPT . . . , 2010.

Y. De Mulder, et al., "Revisiting the BGE Attack on a White-Box AES Implementation". eprint.iacr.org, 2013. URL http://eprint. iacr.org/2013/450.pdf.

T. Lepoint, et al., "Another Nail in the Coffin of White-Box AES Implementations". eprint.iacr.org, 2013. URL http://eprint.iacr. org/2013/455http://eprint.iacr.org/2013/455.pdf.

\* cited by examiner

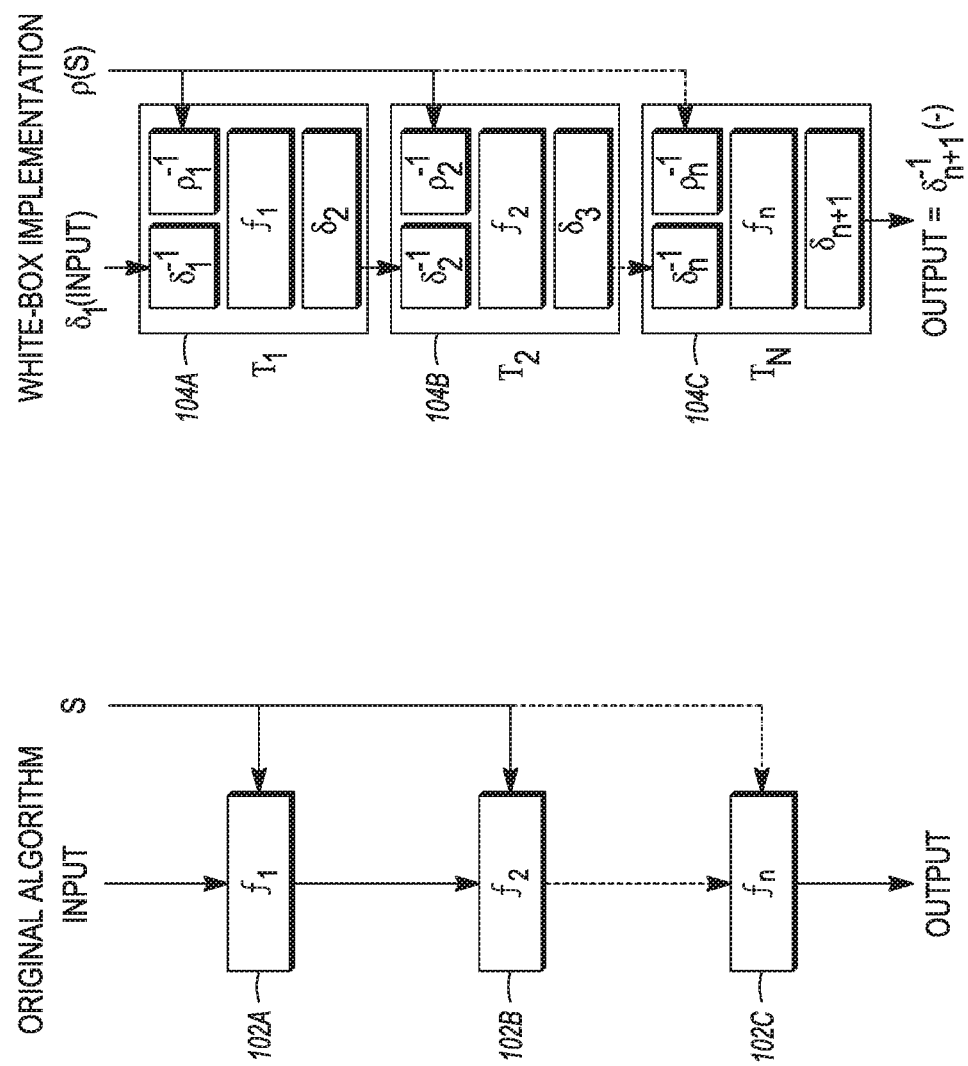

| $x_6$ | $x_5$ | $x_4$ | $x_3$ | $x_2$ | $x_1$ | $y_3$ | $y_2$ | $y_1$ |
|---|---|---|---|---|---|---|---|---|
| 0 | 0 | 0 | 0 | 0 | 0 | 1 | 1 | 0 |
| 0 | 0 | 0 | 0 | 0 | 1 | 1 | 0 | 0 |
| 0 | 0 | 0 | 0 | 1 | 0 | 1 | 1 | 1 |
| 0 | 0 | 0 | 0 | 1 | 1 | 0 | 1 | 1 |
| 0 | 0 | 0 | 1 | 0 | 0 | 0 | 0 | 1 |
| 0 | 0 | 0 | 1 | 0 | 1 | 0 | 0 | 0 |
| 0 | 0 | 0 | 1 | 1 | 0 | 1 | 0 | 1 |
| 0 | 0 | 0 | 1 | 1 | 1 | 0 | 1 | 0 |
| 0 | 0 | 1 | 0 | 0 | 0 | 0 | 1 | 1 |
| 0 | 0 | 1 | 0 | 0 | 1 | 0 | 0 | 1 |
| 0 | 0 | 1 | 0 | 1 | 0 | 1 | 0 | 1 |
| 0 | 0 | 1 | 0 | 1 | 1 | 1 | 1 | 0 |
| 0 | 0 | 1 | 1 | 0 | 0 | 1 | 0 | 0 |
| 0 | 0 | 1 | 1 | 0 | 1 | 0 | 1 | 0 |
| 0 | 0 | 1 | 1 | 1 | 0 | 1 | 1 | 1 |
| 0 | 0 | 1 | 1 | 1 | 1 | 0 | 0 | 0 |
| 0 | 1 | 0 | 0 | 0 | 0 | 0 | 0 | 0 |
| 0 | 1 | 0 | 0 | 0 | 1 | 1 | 1 | 1 |
| 0 | 1 | 0 | 0 | 1 | 0 | 1 | 0 | 0 |
| 0 | 1 | 0 | 0 | 1 | 1 | 0 | 1 | 0 |
| 0 | 1 | 0 | 1 | 0 | 0 | 1 | 0 | 1 |
| 0 | 1 | 0 | 1 | 0 | 1 | 1 | 1 | 0 |
| 0 | 1 | 0 | 1 | 1 | 0 | 0 | 0 | 1 |
| 0 | 1 | 0 | 1 | 1 | 1 | 0 | 1 | 1 |
| 0 | 1 | 1 | 0 | 0 | 0 | 1 | 0 | 1 |
| 0 | 1 | 1 | 0 | 0 | 1 | 0 | 1 | 0 |
| 0 | 1 | 1 | 0 | 1 | 0 | 0 | 1 | 1 |
| 0 | 1 | 1 | 0 | 1 | 1 | 1 | 1 | 1 |
| 0 | 1 | 1 | 1 | 0 | 0 | 0 | 0 | 0 |
| 0 | 1 | 1 | 1 | 0 | 1 | 0 | 0 | 1 |
| 0 | 1 | 1 | 1 | 1 | 0 | 1 | 1 | 0 |
| 0 | 1 | 1 | 1 | 1 | 1 | 1 | 0 | 0 |

*FIG. 2A*

| $x_6$ | $x_5$ | $x_4$ | $x_3$ | $x_2$ | $x_1$ | $y_3$ | $y_2$ | $y_1$ |
|---|---|---|---|---|---|---|---|---|
| 1 | 0 | 0 | 0 | 0 | 0 | 1 | 0 | 0 |
| 1 | 0 | 0 | 0 | 0 | 1 | 1 | 1 | 0 |
| 1 | 0 | 0 | 0 | 1 | 0 | 0 | 0 | 0 |
| 1 | 0 | 0 | 0 | 1 | 1 | 0 | 0 | 1 |
| 1 | 0 | 0 | 1 | 0 | 0 | 0 | 1 | 1 |
| 1 | 0 | 0 | 1 | 0 | 1 | 1 | 1 | 1 |
| 1 | 0 | 0 | 1 | 1 | 0 | 0 | 1 | 0 |
| 1 | 0 | 0 | 1 | 1 | 1 | 1 | 0 | 1 |
| 1 | 0 | 1 | 0 | 0 | 0 | 0 | 0 | 1 |
| 1 | 0 | 1 | 0 | 0 | 1 | 0 | 1 | 1 |
| 1 | 0 | 1 | 0 | 1 | 0 | 0 | 1 | 0 |
| 1 | 0 | 1 | 0 | 1 | 1 | 1 | 0 | 0 |
| 1 | 0 | 1 | 1 | 0 | 0 | 1 | 1 | 0 |
| 1 | 0 | 1 | 1 | 0 | 1 | 1 | 0 | 1 |
| 1 | 0 | 1 | 1 | 1 | 0 | 0 | 0 | 0 |
| 1 | 0 | 1 | 1 | 1 | 1 | 1 | 1 | 1 |
| 1 | 1 | 0 | 0 | 0 | 0 | 0 | 1 | 0 |
| 1 | 1 | 0 | 0 | 0 | 1 | 1 | 0 | 1 |
| 1 | 1 | 0 | 0 | 1 | 0 | 0 | 0 | 1 |
| 1 | 1 | 0 | 0 | 1 | 1 | 0 | 0 | 0 |
| 1 | 1 | 0 | 1 | 0 | 0 | 1 | 1 | 1 |
| 1 | 1 | 0 | 1 | 0 | 1 | 0 | 1 | 1 |
| 1 | 1 | 0 | 1 | 1 | 0 | 1 | 0 | 0 |
| 1 | 1 | 0 | 1 | 1 | 1 | 1 | 1 | 0 |
| 1 | 1 | 1 | 0 | 0 | 0 | 1 | 1 | 1 |
| 1 | 1 | 1 | 0 | 0 | 1 | 0 | 0 | 0 |
| 1 | 1 | 1 | 0 | 1 | 0 | 1 | 1 | 0 |
| 1 | 1 | 1 | 0 | 1 | 1 | 1 | 0 | 1 |
| 1 | 1 | 1 | 1 | 0 | 0 | 0 | 1 | 0 |
| 1 | 1 | 1 | 1 | 0 | 1 | 1 | 0 | 0 |
| 1 | 1 | 1 | 1 | 1 | 0 | 0 | 1 | 1 |
| 1 | 1 | 1 | 1 | 1 | 1 | 0 | 0 | 1 |

*FIG. 2B*

ALGORITHM 1 UNIFORM PPT WHITE-BOX B-CIRCUIT ENCODING ALGORITHM.

REQUIRE B, $\{f_1,...,f_n\}$, n, k

1: $\delta_1 \leftarrow S_k$     GENERATE RANDOM EXTERNAL INPUT ENCODING
2: FOR EACH $1 \leq i \leq n$ DO
3:   $\rho_i \leftarrow S_k$     GENERATE RANDOM SECRET ENCODING
4:   $\delta_{i+1} \leftarrow S_k$     GENERATE RANDOM OUTPUT ENCODING
5:   $c_i \leftarrow$ GENCIRC(B, $f_i$, $\delta_i$, $\rho_i$, $\delta_{i+1}$)     GENERATE WHITE-BOX ENCODING CIRCUIT $c_i$
6: END FOR
7: RETURN $(c_1,...,c_n)$, $\{\delta_1, \delta_{n+1}^{-1}\}$, $\{\rho_1,...,\rho_n\}$

FIG. 3

STRONG WHITE-BOX CRYPTOGRAPHY

CROSS-REFERENCE TO RELATED APPLICATIONS

This application claims benefit of U.S. Provisional Patent Application No. 62/432,830, entitled "STRONG WHITE-BOX CRYPTOGRAPHY," by Lex Aaron Anderson, filed Dec. 12, 2016, which application is hereby incorporated by reference herein.

BACKGROUND

1. Field of the Invention

The present invention relates to systems and methods for protecting unauthorized dissemination and use of data, and in particular to a system and method for generating strong white box cryptographic implementations.

2. Description of the Related Art

The goal of much of cryptography is to allow dissemination of information in such a way that prevents disclosure to unauthorized entities. This goal has been met using cryptographic systems (such as the Advanced Encryption Standard (AES), Triple Data Encryption Standard (TDES), Rivest-Shamir-Adleman (RSA), Elliptic-Curve Cryptography (ECC)) and protocols.

In the systems implementing such cryptographic systems, it is assumed that the attacker only has access to the input and output of the algorithm performing the cryptographic operation, with the actual processing being performed invisibly in a "black box." For such a model to comply, the black box must provide a secure processing environment. Active research in this domain includes improved and special purpose cryptographic systems (e.g., lightweight block ciphers, authentication schemes, homomorphic public key algorithms), and the cryptanalysis thereof.

While such systems are effective, they are still vulnerable to attack. For example, protocols may be deployed in the wrong context, badly implemented algorithms, or inappropriate parameters may introduce an entry point for attackers.

New cryptanalysis techniques that incorporate additional side-channel information that can be observed during the execution of a crypto algorithm; information such as execution timing, electromagnetic radiation and power consumption. Mitigating such side channel attacks is a challenge, since it is hard to de-correlate this side-channel information from operations on secret keys. Moreover, the platform often imposes size and performance requirements that make it hard to deploy protection techniques.

Further exacerbating the foregoing problems, more applications are being performed on open devices with general purpose processors (e.g. personal computers, laptops, tablets, and smartphones) instead of devices having secure processors.

In response to the foregoing problems, many systems use "white-box" techniques, in which it is assumed that the attacker has full access to the software implementation of a cryptographic algorithm: the binary is completely visible and alterable by the attacker; and the attacker has full control over the execution platform (CPU calls, memory registers, etc.). In such systems, the implementation itself is the sole line of defense.

White-box cryptography was first published by Chow et al. (Stanley Chow, Philip A. Eisen, Harold Johnson, and Paul C. van Oorschot. A white-box DES implementation for DRM applications. In Proceedings of the ACM Workshop on Security and Privacy in Digital Rights Management (DRM 2002), volume 2696 of Lecture Notes in Computer Science, pages 1-15. Springer, 2002, hereby incorporated by reference herein). This addressed the case of fixed key white-box DES implementations. The challenge is to hard-code the DES symmetric key in the implementation of the block cipher. The main idea is to embed both the fixed key (in the form of data but also in the form of code) and random data (instantiated at compilation time) in a composition from which it is hard to derive the original key.

The goal of a white-box attacker is to recover the secret from a white-box implementation. Typically, white-box cryptography is implemented via lookup tables encoded with bijections. Since these bijections are randomly chosen, it is infeasible for an attacker to brute-force the encodings for a randomly chosen secret from a sufficiently large keyspace.

What is needed is a system and method for the generation of white-box implementations that resist algebraic attacks against the white-box encodings, which employ knowledge of the underlying cryptosystem to gain information about the encodings themselves. Such attacks against white-box AES, known collectively as the "BGE" attacks, have been presented in the literature. The only assumption of these attacks is that the precise location and structure of the lookup tables is known. Such a system and method is discussed below.

SUMMARY

To address the requirements described above, this document discloses a system and method for generating an output from an input according to a secret using a white-box implementation of a cryptographic function comprising a first operation, a second operation, and a third operation. In one embodiment, the method comprises applying the input to a first operation to generate a first intermediate result; applying the first intermediate result to a second operation to generate a second intermediate result; and applying the second intermediate result to a third operation to generate the output; where at least two of the first operation, the second operation, and the third operation is implemented by a plurality of interconnected logic elements. In one embodiment, the interconnection of the plurality of logic elements is comprised of one of a non-algebraic interconnection of logic elements. In another embodiment, the plurality of logic elements comprises an algebraic interconnection of logic elements having obfuscated boundaries between the at least one of the first operation, the second operation and the third operation. Another embodiment is evidenced by a processor communicatively coupled to a memory storing processor instructions for performing the foregoing operations.

BRIEF DESCRIPTION OF THE DRAWINGS

Referring now to the drawings in which like reference numbers represent corresponding parts throughout:

FIGS. 1A and 1B are diagrams of a cryptographic system for and its corresponding white-box implementation;

FIGS. 2A and 2B are diagrams showing a white-box lookup table;

FIG. 3 is a diagram presenting a method for generating strong white-box implementation;

DETAILED DESCRIPTION

Figure 4A:
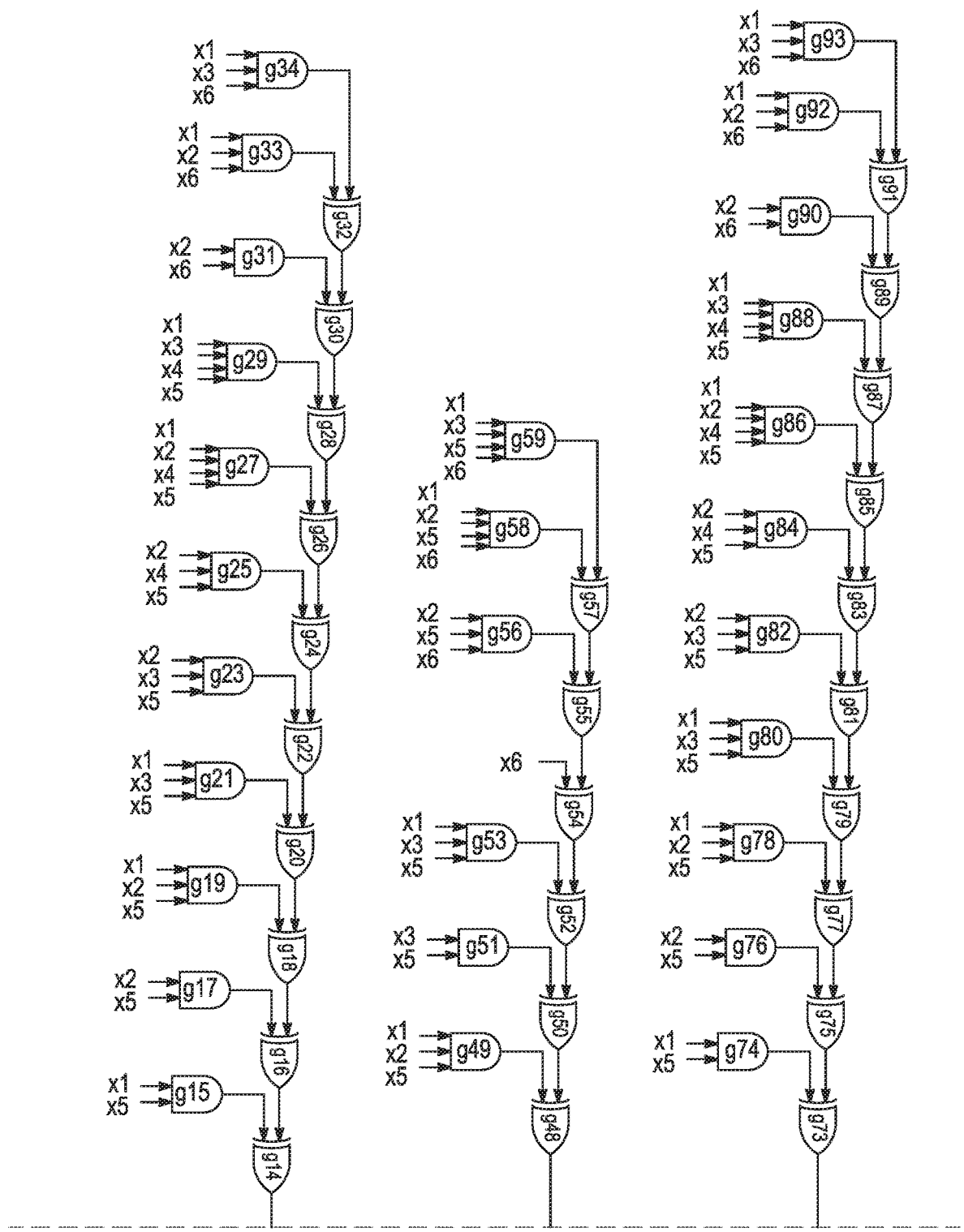
FIGS. 4A and 4B are diagrams presenting a generated Boolean circuit.

In the following description, reference is made to the accompanying drawings which form a part hereof, and which is shown, by way of illustration, several embodiments of the present invention. It is understood that other embodiments may be utilized and structural changes may be made without departing from the scope of the present invention.

FIGS. 1A and 1B are diagrams of a cryptographic system processing an (input) to produce an output, and its corresponding white-box implementation. Similar cryptographic systems are defined in "White-box cryptography," by Steven D Galbraith and L. Aaron Anderson, 2013, pages 1-12, which is hereby incorporated by reference herein.

As shown in FIG. 1A, the algorithm performs functions $f_1$, $f_2$ and $f_n$ (102A, 102B, and 102N, respectively) using secret s.

In FIG. 1B, each operation $f_1, f_2, \ldots, f_n$ in an original algorithm is encoded as a lookup-table $T_1, T_2, \ldots, T_n$ (104A, 104B, and 104N, respectively) in the white-box implementation of that algorithm. The encodings are generated as two sequences of random bijections, $\delta_1, \delta_2, \ldots, \delta_{n+1}$ that are applied to the inputs and output of each operation, where $\rho(s)$ represents an encoded secret (e.g. a secret key), which is either linked statically or provided dynamically to the white-box implementation.

In the white-box implementation shown in FIG. 1B this is implemented by applying bijections $\delta_1$ and $\rho(s)$ as an input to lookup table $T_1$ to obtain an intermediate output, applying the intermediate output and $\rho(s)$ to lookup table $T_2$ to produce a second intermediate output, then providing the second intermediate output and $\rho(s)$ to lookup table $T_3$ to produce output $\delta_{n+1}^{-1}$ (•). Lookup table $T_1$ inverts the bijection $\delta_1$ of the input by $\delta_1^{-1}$, inverts the bijection $\rho$ of s ($\rho(s)$) by $\rho_1^{-1}$, applies $f_1$ and then applies bijection $\delta_2$ to produce the first intermediate output. Similarly, lookup table $T_2$ inverts the bijection $\delta_2$ of the first intermediate input by $\delta_2^{-1}$, inverts the bijection $\rho$ of s ($\rho(s)$) by $\rho_2^{-1}$, applies $f_2$ and then applies bijection $\delta_3$ to produce the first intermediate output. Generally, final lookup table $T_n$ inverts the bijection $\delta_n$ of the n–1$^{th}$ intermediate input by $\delta_n^{-1}$, inverts the bijection $\rho$ of s ($\rho(s)$) by $\rho_n^{-1}$, applies $f_n$ and then applies bijection $\delta_{n+1}$ to produce the intermediate output $\delta_{n+1}^{-1}$(•).

For concreteness, we focus on white box implementations of symmetric-key cryptosystems, such as AES.

Notation: A PPT (probabilistic-polynomial-time) algorithm $\mathcal{A}$ is an algorithm that runs in polynomial time in the length of its inputs, with a probability distribution D={A(x)} for all inputs x. The PPT $\mathcal{A}$ is said to be uniform if D is uniform.

Let (Enc, Dec, Gen, K, M, M') be a heuristically strong symmetric-key cryptosystem, with cipher-pair (Enc, Dec), key generator Gen, key k∈K message m∈M and ciphertext m'∈M'. Then for k←Gen, let m'=Enc(k, m) be an encrypted message, such as a media stream.

Definition 1 (White-Box System):

The system (wbGen, wbCompile, wbEncode, δ, γ) is a white box system, with uniform PPT white-box key-generator wbGen, uniform PPT white-box compiler wbCompile, uniform PPT white-box encoder wbEncode, external input encoding δ and external output encoding γ, if and only if the following properties hold for all white-box instances φ←wbGen:

1. Efficiently computable: For a PT algorithm $\mathcal{A}$ of size n the white-box implementation $\mathcal{A}'$ wbCompile (φ; $\mathcal{A}$) is efficiently computable with blowup l=poly (n).

2. Functionally equivalent. Let Dec'←wbCompile(φ, Dec) be a white-box implementation of the inverse-cipher Dec, then for all messages m∈M, all keys k∈K, each encrypted message m'=Enc (k,m) and each white-box encoded key k'←wbEncode (φ, k), it holds that m=Dec(k, m')=(Dec'(k', (m')))

3. Hard to invert: It is computationally hard to obtain the secret key k∈K given full access to any white-box inverse-cipher implementation Dec' of Dec and encoded key k'. This is a variation on the definition described in "Cryptographic schemes based on the ASASA structure: Black-box, white-box, and public-key," by Alex Biryukov, Charles Bouillaguet, and Dmitry Khovratovich, Advances in Cryptology 2014, which is hereby incorporated by reference herein.

White-Box Key-Recovery Attacks

A goal of a white-box attacker is to recover the secret s from a white-box implementation, where s is encoded with a bijection ρ. Since ρ is randomly chosen, it is infeasible for an attacker to brute-force the encoding for a randomly chosen s from a sufficiently large keyspace.

FIGS. 2A and 2B are diagrams showing a white-box lookup table. In the illustrated example the lookup table $f'$: $\{0, 1\}^3 \times \{0, 1\}^3 \rightarrow \{0,1\}^3$ that satisfies the encoding: $f'(\delta(x_6, x_5, x_4), \rho(x_3,x_2,x_1,))=(y_3, y_2, y_1)=\gamma((x_6, x_6, x_6) \oplus (x_6, x_6, x_6),)$ where δ:=(2 3 4 0)(5 1)(6 7), ρ:=(4 2 6 5 7 1 0)(3)(6 7) and γ:=(0)(7 5 6 2 1)(3)(4) are random bijections, defined in cycle notation. For example, in cycling notation, a permutation with the following rules: 1→3, 2→6, 3→4, 4→5, 5→1, 6→2, 7→7 and 8→8 can be written in cycle notation as: (3 4 5 1) (6 2) (7) (8).

In real-word implementations, white-box lookup-tables typically represent word sized operations, such as $f$: $\{0, 1\}^{16} \rightarrow \{0, 1\}^8$, which can be stored in a memory array of 64K bytes.

To attain a computationally feasible key recovery work factor, knowledge of the algebra of the underlying cipher is used to gain information about the secret key. Such attacks against white-box AES are known collectively as the Billet, Gilbert and Ech-Chatbi or "BGE" attacks. Such attacks have been described in "Cryptanalysis of a white box AES implementation. In Selected Areas in Cryptography," by O Billet, H Gilbert, and C Ech-Chatbi, volume 3357, pages 227-240. Springer, 2005; "Cryptanalysis of a perturbated white-box AES implementation. Progress in Cryptology- INDOCRYPT," by Yoni De Mulder, Brecht Wyseur, and Bart Preneel, 2010; "Revisiting the BGE Attack on a White-Box AES Implementation," by Yoni De Mulder, Peter Roelse, and Bart Preneel, eprint.iacr.org, 2013; and "Another Nail in the Coffin of White-Box AES Implementations," by Tancrède Lepoint and Matthieu Rivain, eprint.iacr.org, 2013, all of which are hereby incorporated by reference. The only assumption of these attacks is that the precise location and structure of the lookup tables $T_1$, $T_2, \ldots, T_n$ is known, as described in "A Framework for Measuring Software Obfuscation Resilience Against Automated Attacks," by Sebastian Banescu, M Ochoa, and Alexander Pretschner, In Software Protection (SPRO), 2015 IEEE/ACM 1st International Workshop on, pages 45-51. IEEE, 2015.

Given this knowledge of a white-box AES implementation (as described in "White-Box Cryptography, and an AES Implementation," by Stanley Chow, Philip Eisen, Harold Johnson, and Paul C Van Oorschot, In Selected Areas in Cryptography, pages 250-270, Springer, 2003, which is hereby incorporated by reference herein), an attack can recover the hidden 128-bit secret key with a work factor of $2^{22}$, which is an upper bound on the lower bound for the work factor of automatic secret key recovery attacks against this white-box. Such a possible attack is described in "Revisiting the BGE Attack on a White-Box AES Implementation," by Yoni De Mulder, Peter Roelse, and Bart Preneel, eprint.iacr.org, 2013.

Partitioned Boolean Circuit Construction

Lookup-tables in white-box implementations are "obvious" algebraic structures that can be identified with the likes of dynamic binary analysis and other similar attacks. To attain resilience against algebraic cryptanalysis we dispense with lookup tables and instead propose a partitioned Boolean circuit construction to hide or completely remove the boundaries between the white-box encoded operations in the final implementation.

More formally, let B be a set of Boolean functions. By [B] we denote the class of all Boolean functions that can be obtained by the following rule: If $(x_1, \ldots, x_n) \in [B]$ and $x_1$, are either Boolean variables or elements from [B], then $f(x_1, \ldots, x_n) \in [B]$.

We say that B is a closed basis if [B]=B, where it is interesting to note that [B] is exactly the class of Boolean functions that can be computed by circuits with gates from B.

Definition 2 (Boolean Circuit)

An n-input Boolean circuit over a closed basis B is a directed graph, where each node is labelled either with a variable $x_i$, or a function from B, called a gate. The edges connecting the nodes are called wires. The number of wires pointing into a gate is called its fan-in, and the number of wires leaving a gate is called its fan-out. The Boolean circuit may be implemented by one or more "gates" which may be implemented by hardware logic gates or by use of a processor implementing analogous functionality using lookup tables.

Suppose we have a Boolean circuit $C_1$ computing the n-ary Boolean function $f_{c_1}$, and another Boolean circuit $C_2$ computing an m-ary function $f_{c_2}$. We can derive new Boolean circuits that may be used to obfuscate the functionality of the circuit in a number of ways including the use of the following Mal'tsev superposition operations:

A new circuit $C'_1$ may be obtained by adding a variable to $C_1$. Since no new edges are added, the new node has no influence on the computed Boolean function besides the higher arity. We call this operation introduction and obtain:

$$\forall x_1, \ldots, x_{n+1} \in \{0,1\}: f c'_1(x_1, \ldots, x_{n+1}) = f_{c_1}(x_1, \ldots, x_{n+1}).$$

Circuit $C'_1$ may also be obtained from $C_1$ by arbitrarily permuting the variables. This operation will be called permutation; and if $\pi \in S_n$ is our permutation, we have:

$$\forall x_1, \ldots, x_n \in \{0,1\}: fc'_1(x_1, \ldots, x_n) = f_{c_1}(x_{\pi_1^{-1}}, \ldots, x_{\pi_n^{-1}}).$$

Since the fan-out of gates is not restricted, we can remove all outgoing edges of one input gate g of $C_1$ and assign them to another input gate $g_j$. After this operation, $g_i$ is a fictive gate and is deleted. The derived circuit $C'_1$ thus computes a function of arity n−1, given by:

$$\forall x_1, \ldots, x_n \in \{0,1\}: f'_{c_1}(x_1, \ldots, x_{i-1}, x_{i+1}, \ldots, x_n) = f_{c_1}(x_1, \ldots, x_{i-1}, x_j, \ldots, x_n).$$

This operation may be referred to as deletion.

A gate $g_n$ of $C_1$ can be replaced by the whole circuit $C_2$, to obtain a new Boolean circuit C' of arity n+m−1. For the Boolean function $f'_c$ obtained in this way, we have a substitution operation:

$$\forall x_1, \ldots, x_n \in \{0,1\}: f'_{c_1}(x_1, \ldots, x_{n+m-1}) = f_{c_1}(x_1, \ldots, x_{i-1}, f_{c_2}(x_n, \ldots, a_{n+m-1})).$$

Since every Boolean circuit can be obtained by a sequence of the above superposition operations, they may be used to generate a circuit for uniform PPT white-box implementation.

Given n functions $\{f_1, \ldots, f_n\}$ in an original algorithm $\mathcal{A}$, FIG. 3 is a diagram presenting a method for generating white-box encoded circuits $C=\{c_1, \ldots, c_n\}$ under a closed basis B with maximum fan-in k, such that for $1 \leq i \leq n$, it holds that $$\forall a,b \in \{0,1\}^k: c_i(\delta_i(a), \rho_i(b)) = \delta_{i+1}(f_i(a,b)) \quad (1)$$

Let $S_k$ represent the symmetric group of degree k, with symbols in $\{0, \ldots, k-1\}$, then:
1. Generate a random external input encoding (bijection) $\delta_1$ by uniformly random sample from $S_k$.
2. For each $1 \leq i \leq n$
   a. Generate a random secret encoding $\rho_i$ by uniformly random sample from $S_k$.
   b. Generate a random output encoding $\delta_{i+1}$ by uniformly random sample from $S_k$.
   c. Generate a white-box encoded circuit $c_i$ under basis B that computes (1).
3. Return
   a. The generated circuits $\{c_1, \ldots, c_n\}$.
   b. The generated input and output encodings $\{\delta_0, \delta_{n+1}^{-1}\}$.
   c. The generated secret encodings $\{\Sigma_1, \ldots, \rho_n\}$.

Figure 4B:
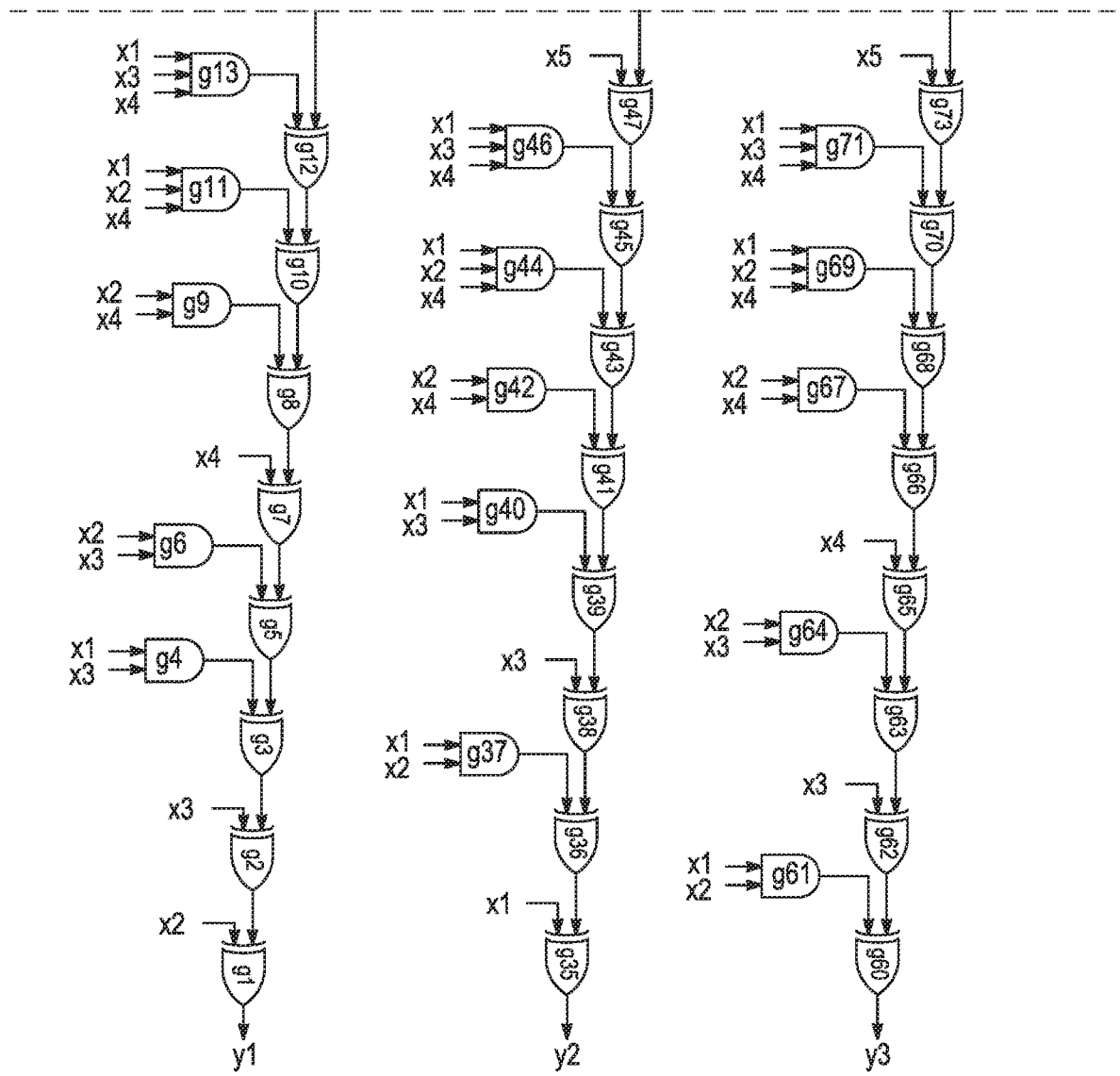

FIGS. 4A and 4B are diagrams presenting a generated Boolean circuit to yielding the white box encoding in equation 1 and summarized in the lookup table of FIGS. 2A and 2B using the foregoing method.

Figure 5:
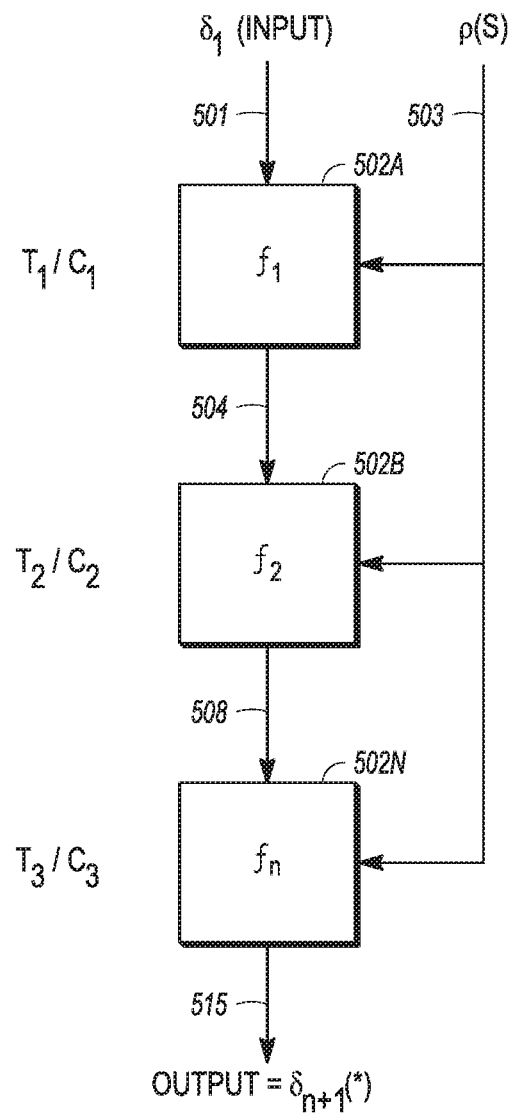
FIG. 5 is a diagram illustrating the implementation of cryptographic operations using a white-box at least partially implemented by logic gates such as hardware logic gates.
Figure 6:
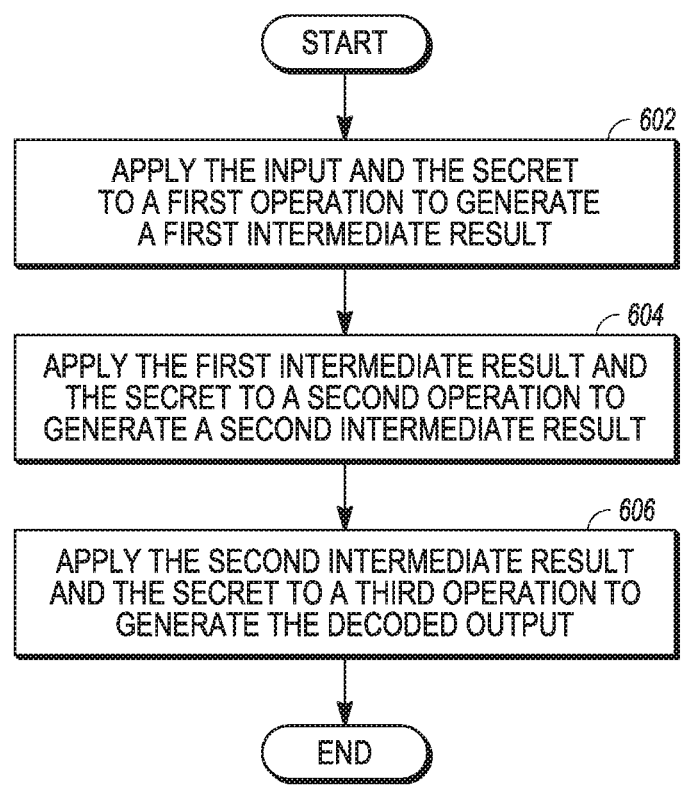
FIG. 6 is a diagram illustrating an improved white box system using Boolean circuits.

FIG. 5 is a diagram illustrating the implementation of cryptographic operations using a white-box at least partially implemented by logic gates such as hardware logic gates. FIG. 6 will be discussed in conjunction with FIG. 6, which is an illustration of an improved white box system using Boolean circuits. Like the non-white-box implementation illustrated in FIG. 1A, the white-box implementation performs functions $f_1, f_2$ and $f_n$ (102A, 102B, and 102N) using secrets. Unlike the white-box implementation illustrated in FIG. 1B, two or more of the functions $f_1, f_2$ and $f_n$ (102A, 102B, and 102N) is performed using Boolean circuits $C_1, C_2$ and $C_n$, respectively rather than lookup tables $T_1, T_2, T_n$. As such functions may be performed by either a processor using a lookup table stored in a memory or Boolean circuits, the entities that perform these functions are hereinafter referred to as modules 502, 502B and 502C, respectively.

Referring now to FIG. 6, an input 501 and ρ(S) 503 are provided to a first operation $f_1$ implemented by module 502A to generate a first intermediate result 504. In block 704, the first intermediate result 504 and the secret 503 are applied to a second operation $f_2$ implemented by module 502B to generate a second intermediate result 508. In block 706, the second intermediate result 508 and secret 503 are applied to a third operation $f_3$ to generate the output 515. At least two of the first operation, the second operation, and the third operation is implemented by a plurality of interconnected logic elements. For example, if the first operations $f_1$ and $f_2$ include comprise the operation described in Equation (1), the lookup table $T_1$ illustrated in FIGS. 2A and 2B (a white-box implementation of Equation (1) can instead be performed by the Boolean circuit illustrated in FIGS. 4A and 4B, as generated by performing step 5 of the of the operations illustrated in FIG. 3.

In one embodiment, the interconnection of the plurality of logic elements being comprised of one of a non-algebraic interconnection of logic elements. The use of a non-algebraic interconnection of logic elements prevents or substantially inhibits the white-box attacks described above.

Standard lookup tables used in white-box cryptography are "quasigroups" in the group theoretic sense. A quasigroup is an algebraic structure that consists of a set of elements along with an operation * that combines the two elements to form a third element that satisfies the axiom of closure and a "latin" property, such that for any two integers a, b in G, a*b is also an integer in G, thus satisfying the closure requirement. Also, for all integers a, b in G, there exist unique elements x and y also in G, where it holds that a*x=b and y*a=b.

However, Boolean circuits can be devised that do not meet the requirements for a group, or even for an algebra. Non-algebraic Boolean circuits can be devised that comply with only one of the requirements of a group, namely, the closure requirement. One technique for generating non-algebraic interconnections can be established for example, by using a cyclic circuit as described below.

In another embodiment, the an algebraic interconnection of logic elements is used, but the interconnection of logic elements is obfuscated. This can be accomplished by randomizing the interconnection of logic elements and/or obfuscating the boundaries between the at least one of the first operation, the second operation and the third operation, as further described below.

As is plain from the Boolean circuit illustrated in FIGS. 4A and 4B, even simple functions (e.g. the exclusive OR operation of Equation (1) can result in a randomized Boolean circuit $C_1$ having a large number of gates. Techniques for improving the security of a white-box implementation with such gates are also discussed below.

Randomized Interconnected Logic Gates

Figure 7:
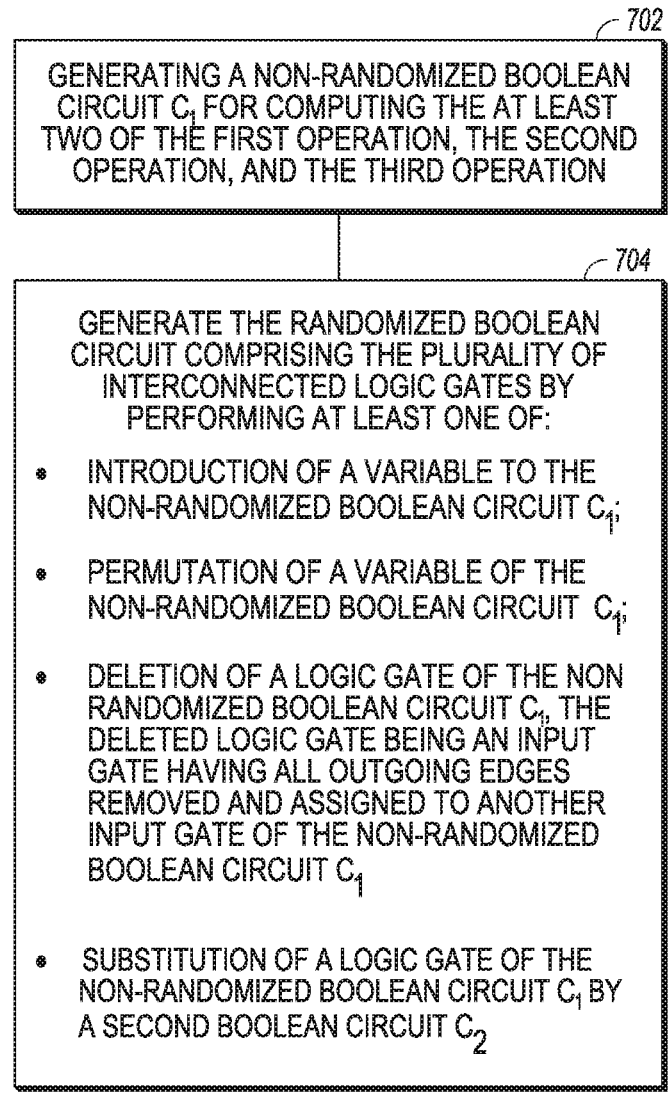
FIG. 7 is a diagram illustrating exemplary process steps that can be used to generate the randomized Boolean circuit comprising the plurality of interconnected logic gates.

FIG. 7 is a diagram illustrating exemplary process steps that can be used to generate a randomized Boolean circuit comprising the plurality of interconnected logic gates. In block 702, a non-randomized circuit $C_1$ is generated for computing at least one of the first operation, the second operation, and the third operation. In block 704, the randomized Boolean circuit is generated by performing at least one of (A) introduction of a variable into the non-randomized Boolean circuit $C_1$, (B) permutation of a variable of the non-randomized Boolean circuit $C_1$, (C) deletion of a logic gate of the non-randomized Boolean circuit $C_1$, wherein the deleted logic gate is an input gate having all outgoing edges removed and assigned to another input gate of the non-randomized Boolean circuit $C_1$, and (D) substitution of a logic gate of the non-randomized Boolean circuit $C_1$ by a second Boolean circuit $C_2$, as described above.

"Cyclic" Encoding

Cyclic circuit implementations can be defined that have having equivalent input-output relationships as non-cyclic (acyclic) implementations. Such acyclic implementations are non-algebraic (across operation boundaries), as they do not satisfy the requirements to qualify them as an algebra, thus making such white-box implementations using such structures more resistant to attack. Further, in some cases, cyclic circuit implementations can have as few as one-half the gates required for equivalent acyclic circuits.

Thus, cyclic circuit implementations can also hide or completely remove function boundaries in Boolean circuit implementations, and deny hackers the ability to infer the functionality of white-box implementation. For example, referring to FIG. 5, if a hacker is able to identify which functional elements perform function $f_1$ to produce intermediate result 504, the job of determining the functions performed by $f_1$ becomes easier (e.g. by simply observing input-output behavior). However, if the point where the intermediate output of function $f_1$ is obfuscated, the hacker will find it difficult to infer such functionality from the input/output behavior. Therefore, from a security perspective, selective random cyclic substitutions act as a kind of "partitioning" that can hide or completely remove the function boundaries in Boolean circuit implementations.

Figure 8A:
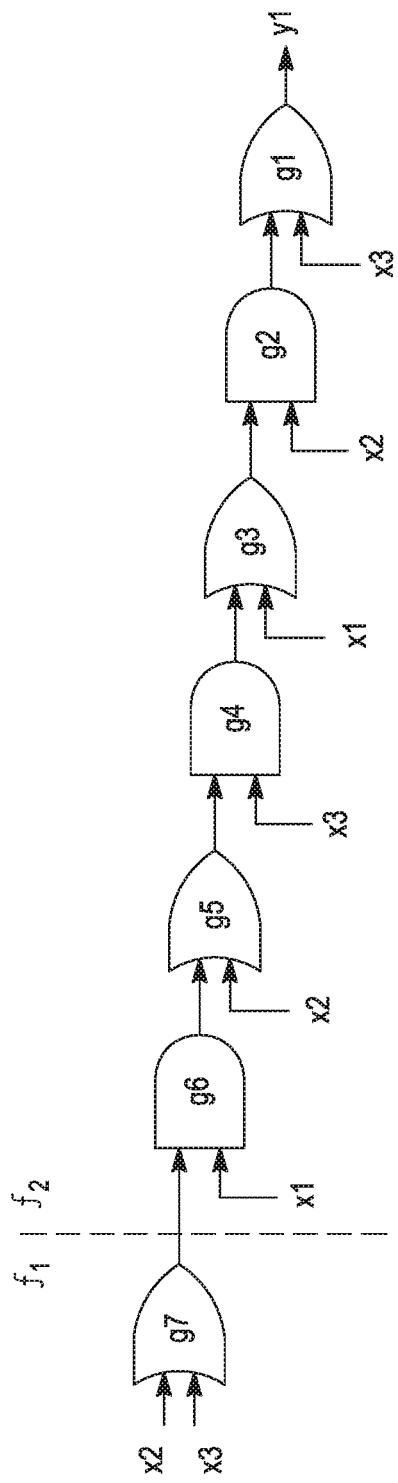
FIGS. 8A and 8B are diagrams illustrating a simple case of how selective random cyclic substitutions may be used to reduce the number of gates in the randomized Boolean circuit and also hide or remove function boundaries.
Figure 8B:
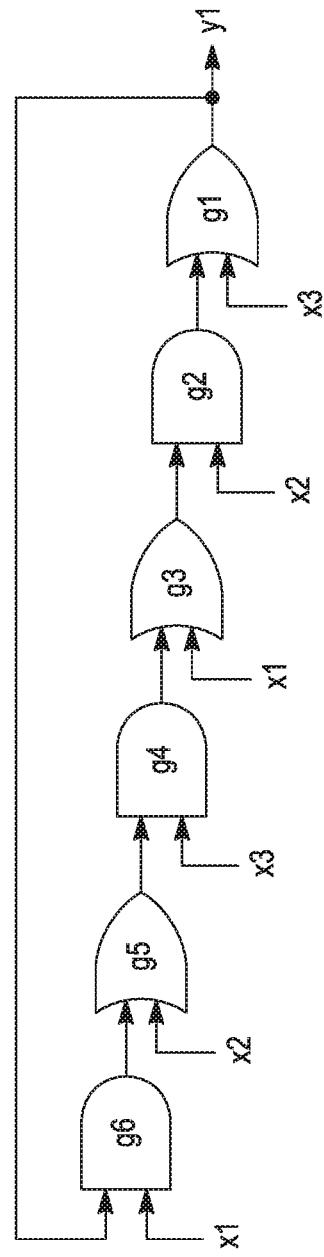

FIGS. 8A and 8B are diagrams illustrating a simple case of how selective random cyclic substitutions may be used to reduce the number of gates in the randomized Boolean circuit and also hide or remove function boundaries.

FIG. 8A presents an exemplary acyclic Boolean circuit (left) and FIG. 8B presents the equivalent cyclic Boolean circuit (right) with one fewer gate, where the removed gate $g_7$ is the output gate of the previous operation, hence concealing the output of $f_1$ "in" the cyclic circuit implementation of $f_2$. Under this hypothesis we say that the cyclic Boolean circuit implementation of $f_1$ and $f_2$ is nonseparable or "strongly connected." Strongly connected circuits may be defined as described in Definition 3 below:

Definition 3 (Strongly Connected Components):

In a directed graph G, a strongly connected component is an induced subgraph $S \subseteq G$, such that (1) There exists a directed path between every pair of nodes in S, and (2) for every node $s \in S$ and every node $n \notin S$, if there exists a path from s to n (from n to s) then there is no path from n to s (from s to n, respectively).

Theorems 1 and 2 may be postulated.

Theorem 1 (Menger's theorem [23]). Let u and v be distinct, non-adjacent vertices in a graph G. Then the maximum number of internally disjoint u-v paths in G equals the minimum number of vertices needed to separate u and v.

Theorem 2 (Nonseparable [11]). Let G be a directed graph. Then G is nonseparable if and only if any two edges lie on a common cycle.

Proof. Suppose G is separable such that G can be decomposed into two connected subgraphs $S_1$ and $S_2$. Then no one is contained in another and have exactly one vertex v in common. Let $e_i$ be edges of $S_i$, i=1, 2 incident with v.

If one of $e_1$, $e_2$ is a loop, then there is no cycle containing both $e_1$ and $e_2$. This leads to a contradiction, therefore $e_i$ are not loops. Let $v_i$ be another end-vertex of $e_i$, i=1, 2 other than v. Clearly there is no $v_1v_2$ path in G−v. Hence, there is no cycle in G that contains both $e_1$ and $e_2$.

If G is a loop, then nothing is to be proved.

If G is not a loop, then G has no loops. If we assume that G has at least two edges. Let e be an edge with end-vertices $v_1$ and $v_2$. Subdivide e into two edges by introducing a new vertex w on e to obtain a new graph G'. We claim that G' is also nonseparable. By way of contradiction, suppose that is separable. Then G must be separated at the vertex w into two connected subgraphs $G'_1$ and $G'_2$. We may assume that vi belongs to $G'_i$, i=1, 2. Then w is a cut vertex of G' and subsequently the edge e is a cut edge of G. Thus G\e has two connected components $G_1$ and $G_2$ with $v_i \in V(G_i)$. Since G has at least two edges, then either $G_1$ has an edge at $v_1$ or $G_2$ has an edge at $v_2$. If we suppose that $G_1$ has an edge at $v_1$, then G can be separated at $v_1$ into $G_1$ and $G_2 \cup e \cup v_1$. This is a contradiction.

Finally, let $e_1$ and $e_2$ be two edges of G. Subdivide $e_i$ by introducing a new vertex $v_i$ on $e_i$ to obtain a new graph $G'_i$, i=1, 2. Then, $G'_i$ is nonseparable and the graph G' is also nonseparable and has at least three vertices. Since Nonseparable graphs have no cut vertices, then by theorem 1, there are two internally disjoint $v_1v_2$-paths and therefore there is a cycle containing both edges $e_1$ and $e_2$.

Secure Circuit Partitioning Construction

Circuit partitioning divides a given circuit into a collection of smaller sub-circuits subject to specific constraints, such as fan-in size or depth, as described in "Large Scale Circuit Partitioning with Loose/Stable Net Removal and signal Flow Based Clustering," by J. Cong, H. P. Li, Sung Kyu, Lim Sung Kyu Lim, T. Shibuya, and Dongmin Xu Dongmin Xu, Computer-Aided Design, 1997. Digest of Technical Papers., 1997 IEEE/ACM International Conference, ISSN 1092-3152.

These methods are typically oriented around efficiency, whereas our primary interest is using circuit partitioning to conceal functional boundaries in the white-box implementation. The goal of the partitioning algorithm is to slice the graph of C into partitions that are orthogonal to the original function boundaries. These slices are then converted into Boolean gates (or equivalent look up tables (LUTs)) with a fan-in equal to the number of inputs in that slice, bound by the parameter k.

Returning to the generalized embodiment of FIGS. 4A and 4B, one embodiment of this technique is evidenced by one in which the first operation 502A and the second operation 502B are implemented by the plurality of interconnected logic gates and the first operation 502A and the second operation 502B are partially implemented by a partition (S) of the interconnected logic gates, which may be constructed of a one or more higher order gates.

Figure 9:
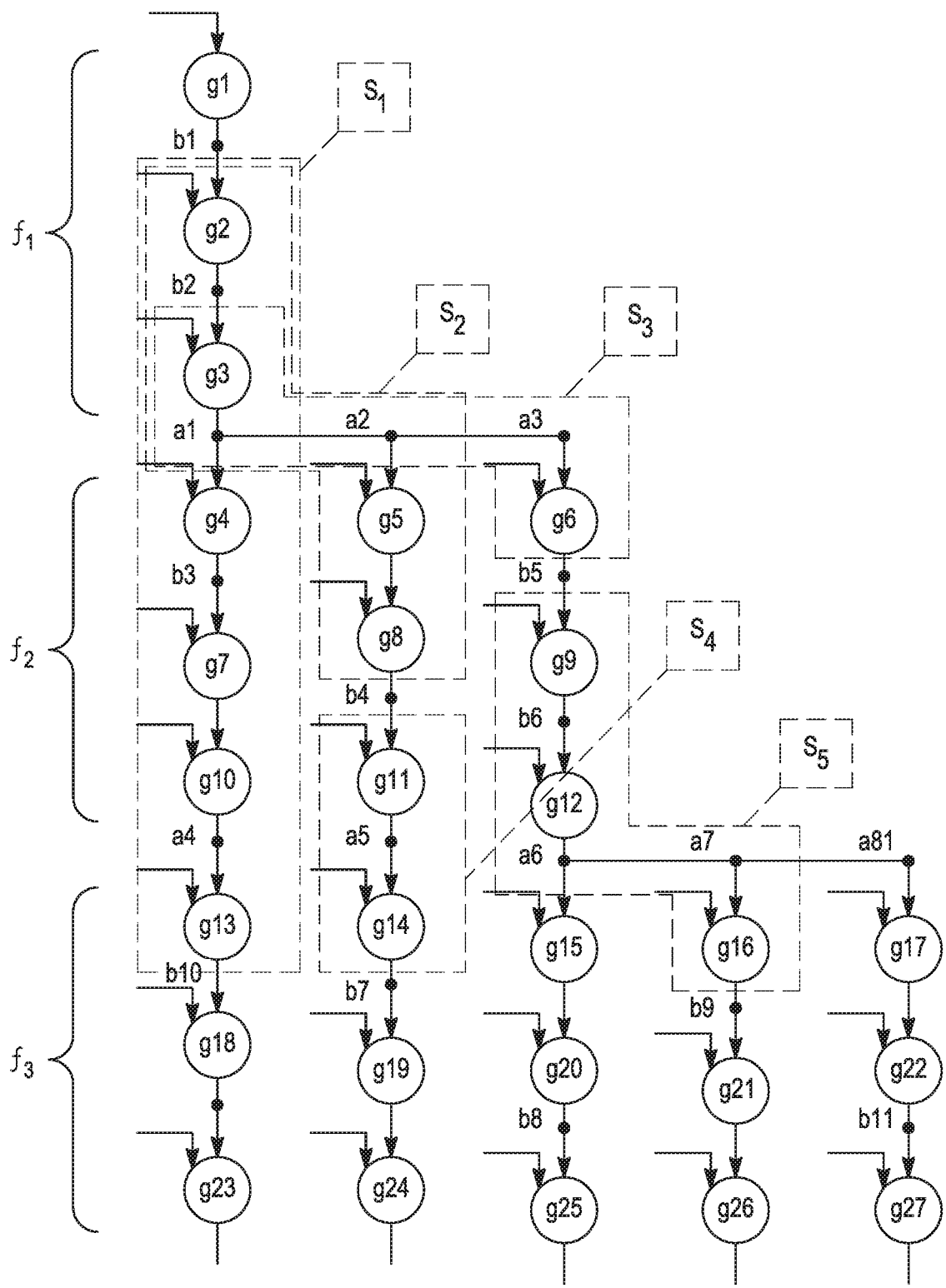
FIG. 9 is a diagram presenting a circuit partitioning example illustrating a white-box encoded circuit computing $f_1 \circ f_2 \circ f_3$, with original function boundaries $a_1, a_2, \ldots, a_8$.

FIG. 9 is a diagram presenting a circuit partitioning example illustrating a white-box encoded circuit computing $f_1 \circ f_2 \circ f_3$, with original function boundaries $a_1, a_2, \ldots, a_8$. The algorithm partitions the circuit into slices $S_1, \ldots, S_5$ (only 5 are illustrated for the purposes of clarity) with new boundaries $b_1, b_2, \ldots, b_{11}$ that don't overlap the original function boundaries. Each slice is then converted into a Boolean gate (LUT).

Figure 10:
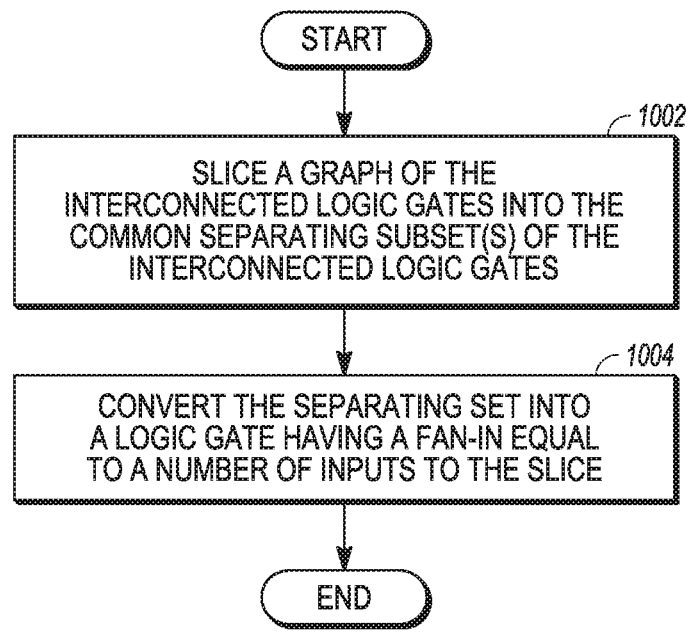
FIG. 10 is a diagram illustrating exemplary operations that can be performed to define the partition (S) of interconnected logic gates.

FIG. 10 is a diagram illustrating exemplary operations that can be performed to define the subset (S) of interconnected logic gates common to adjacent functions. In block 1002, a graph (e.g. topological interconnection) of the interconnected logic gates is sliced to define a subset (S) of the logic gates common to $f_1$ and $f_2$. For example, referring to FIG. 9, the illustrated slice defines the following subsets of the gates:

$S_1$: Gates $g_2, g_3, g_4, g_7, g_{10}$ and $g_{13}$, common to functions $f_1$ and $f_2$, and $f_3$;

$S_2$: Gates $g_2, g_3, g_5$, and $g_8$, common to functions $f_1$ and $f_2$;

$S_3$: Gates $g_3$ and $g_6$, common to functions $f_1$ and $f_2$;

$S_4$: Gates $g_{11}$ and $g_{14}$, common to functions $f_2$ and $f_3$; and $S_5$: Gates $g_9, g_{12}$ and $g_{16}$, common to functions $f_1$ and $f_2$.

In block 1004, the set $S_1$ is converted into a gate having a fan-in (number of inputs) equal to the number of inputs for the slice. In the example presented in FIG. 9, the following gates having the number of inputs can be substituted for the associated subset of gates. This process is performed for additional sets S as required.

The foregoing has the effect of compressing the randomized circuit implementation into fewer operations, while also concealing the original function boundaries. Table I below presents a table illustrating Boolean gates generated from the partitioning presented in FIG. 9. Note that the number of gates has been substantially reduced and the new boundaries do not overlap the original function boundaries, increasing the cost of algebraic attacks against the implementation.

TABLE I

Boolean gates Generated from the Partitioning of FIG. 9.

| Slice | Original | | New | |
|---|---|---|---|---|
| | # Gates | Fan-in | #Gates | Fan-in |
| $S_1$ | 6 | 2 | 1 | 7 |
| $S_2$ | 3 | 2 | 1 | 5 |
| $S_3$ | 2 | 2 | 1 | 3 |
| $S_4$ | 2 | 2 | 1 | 3 |
| $S_5$ | 3 | 2 | 1 | 4 |

Hardware Environment

Figure 11:
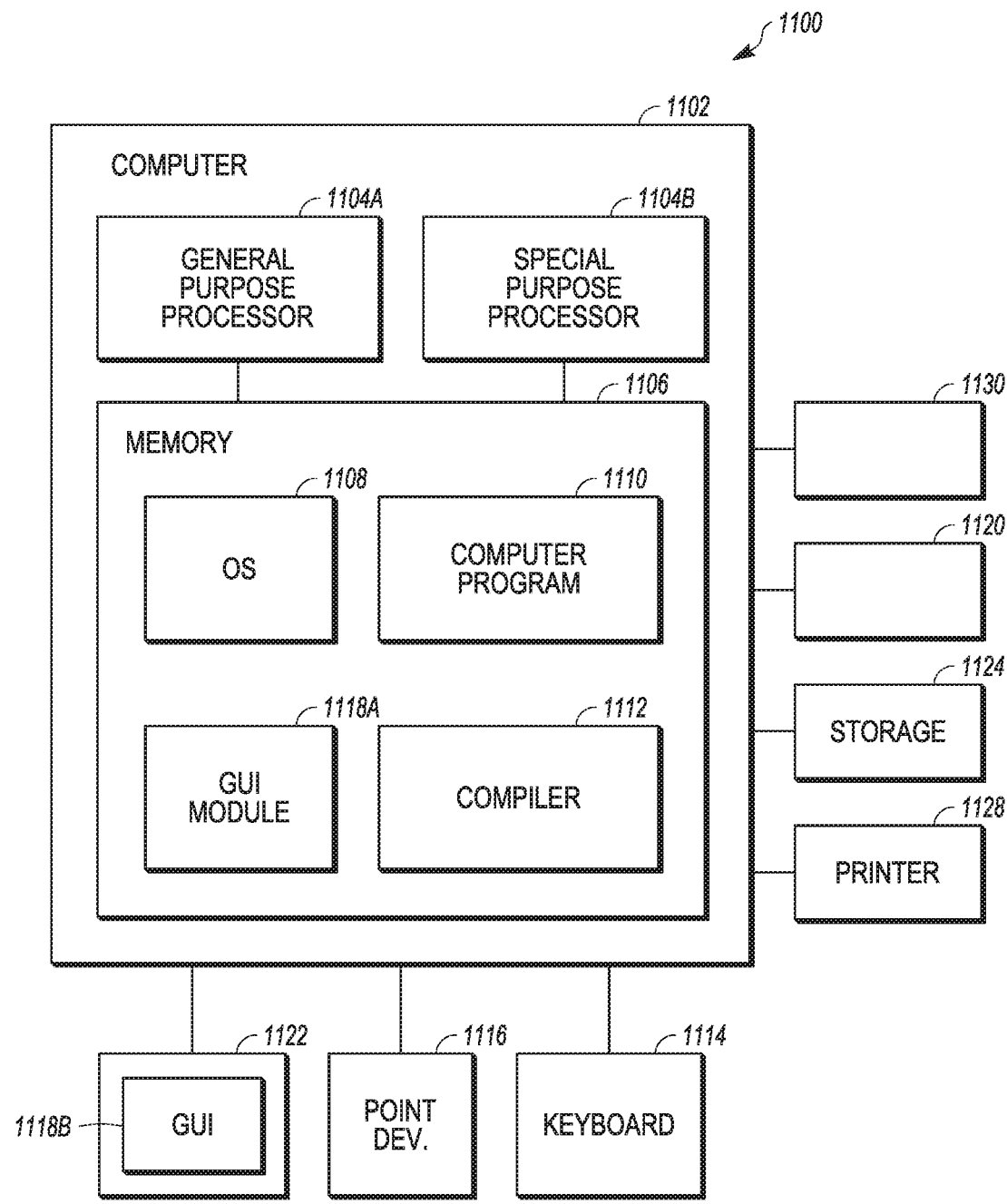
FIG. 11 is a diagram illustrating an exemplary computer system that could be used to implement elements of this disclosure.

FIG. 11 is a diagram illustrating an exemplary computer system 1100 that could be used to implement elements of this disclosure, including one or more of the modules 102A-102C implementing the original algorithm, a computer implementing the white box implementations of FIG. 1B, or a computer used in designing the randomized Boolean logic gates of FIG. 5. The computer 1102 comprises a general purpose hardware processor 1104A and/or a special purpose hardware processor 1104B (hereinafter alternatively collectively referred to as processor 1104) and a memory 1106, such as random access memory (RAM). The computer 1102 may be coupled to other devices, including input/output (I/O) devices such as a keyboard 1114, a mouse device 1116 and a printer 1128.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108 to provide output and results.

Output/results may be presented on the display 1122 or provided to another device for presentation or further processing or action. In one embodiment, the display 1122 comprises a liquid crystal display (LCD) having a plurality of separately addressable pixels formed by liquid crystals. Each pixel of the display 1122 changes to an opaque or translucent state to form a part of the image on the display in response to the data or information generated by the processor 1104 from the application of the instructions of the computer program 1110 and/or operating system 1108 to the input and commands. Other display 1122 types also include picture elements that change state in order to create the image presented on the display 1122. The image may be provided through a graphical user interface (GUI) module 1118A. Although the GUI module 1118A is depicted as a separate module, the instructions performing the GUI functions can be resident or distributed in the operating system 1108, the computer program 1110, or implemented with special purpose memory and processors.

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1102 may also implement a compiler 1112 which allows an application program 1110 written in a programming language such as COBOL, C++, FORTRAN, or other language to be translated into processor 1104 readable code. After completion, the application or computer program 1110 accesses and manipulates data accepted from I/O devices and stored in the memory 1106 of the computer 1102 using the relationships and logic that was generated using the compiler 1112.

The computer 1102 also optionally comprises an external communication device such as a modem, satellite link, Ethernet card, or other device for accepting input from and providing output to other computers.

In one embodiment, instructions implementing the operating system 1108, the computer program 1110, and/or the compiler 1112 are tangibly embodied in a computer-readable medium, e.g., data storage device 1120, which could include one or more fixed or removable data storage devices, such as a zip drive, floppy disc drive 1124, hard drive, CD-ROM drive, tape drive, or a flash drive. Further, the operating system 1108 and the computer program 1110 are comprised of computer program instructions which, when accessed, read and executed by the computer 1102, causes the computer 1102 to perform the steps necessary to implement and/or use the present invention or to load the program of instructions into a memory, thus creating a special purpose data structure causing the computer to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1102.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method for providing digital signal security comprising:
   generating at least one output from at least one input and at least one secret that uses a white-box implementation of a randomized cryptographic function, the randomized cryptographic function obtained by at least one random operation performed on the whole of a non-randomized function;
   providing the randomized cryptographic function as a plurality of interconnected logic elements, the interconnection of the plurality of logic elements being comprised of non-algebraic interconnection of logic elements and algebraic interconnection of logic elements having obfuscated boundaries between the at least one input and output;
   wherein the non-algebraic interconnected logic elements comprises a cyclic connection of at least a portion of the plurality of interconnected logic elements that produces an equivalent input-output relationship of a non-cyclic connection of logic elements;
   wherein the logic elements are Boolean circuit gates; and
   wherein the randomized cryptographic function has fewer Boolean circuit gates than the whole of the nonrandomized function.

2. The method of claim 1 wherein the logic elements are implemented by associated lookup tables.

3. The method of claim 1, wherein the randomized cryptographic function is implemented by a subset (S) of the plurality of interconnected logic elements.

4. The method of claim 3, wherein the subset (S) of the plurality of interconnected logic elements is defined by:
   slicing a graph of the plurality of interconnected logic elements into the subset (S) of the plurality of interconnected logic elements; and
   converting the subset (S) into a logic element having a fan-in equal to a number of inputs to the slice.

5. The method of claim 4, wherein each of the plurality of interconnected logic elements are Boolean hardware circuit gates.

6. The method of claim 4, wherein the each of the plurality of interconnected logic elements are implemented by an associated lookup table.

7. The method of claim 1, wherein the plurality of interconnected logic elements is randomized by performing a plurality of Mal'tsev superposition operations on a nonrandomized interconnection of plurality of logic elements for computing the randomized cryptographic function.

8. The method of claim 1, wherein the plurality of interconnected logic elements is a randomized plurality of interconnected logic elements, randomized by:
generating a non-randomized plurality of interconnected logic elements C1 for computing the randomized cryptographic function;
performing at least one of the following on the non-randomized plurality of interconnected logic elements—C1 to generate the randomized plurality of interconnected logic elements:
introduction of a variable to the non-randomized plurality of interconnected logic elements C1;
permutation of a variable of the non-randomized plurality of interconnected logic elements C1;
deletion of a logic element of the non-randomized plurality of interconnected logic elements C1, the deleted logic element being an input gate having all outgoing edges removed and assigned to another input gate of the plurality of interconnected logic elements C1; and
substitution of a logic gate of the plurality of interconnected logic elements C1 by a second interconnection of logic elements C2.

9. An apparatus for providing digital signal security comprising:
a processor;
a memory, communicatively coupled to the processor, the memory storing instructions comprising instructions for:
generating at least one output from at least one input according to a secret that uses a white-box implementation of a randomized cryptographic function, the randomized cryptographic function obtained by at least one random operation performed on the whole of a nonrandomized function;
providing the randomized cryptographic function as a plurality of interconnected logic elements, the interconnection of the plurality of logic elements being comprised of anon-algebraic interconnection of logic elements and an algebraic interconnection of logic elements having obfuscated boundaries between the at least one input and output;
wherein the non-algebraic plurality of interconnected logic elements comprises a cyclic connection of at least a portion of the plurality of interconnected logic elements that produces an equivalent input-output relationship of a non-cyclic connection of logic elements,
wherein the logic elements are Boolean circuit gates; and
wherein the randomized cryptographic function has fewer Boolean circuit gates than the whole of the nonrandomized function.

10. The apparatus of claim 9, wherein the randomized cryptographic function is implemented by a subset (S) of the plurality of interconnected logic elements.

11. The apparatus of claim 10, wherein the subset (S) of the plurality of interconnected logic elements is defined by:
slicing a graph of the plurality of interconnected logic elements into the subset (S) of the plurality of interconnected logic elements; and
converting the subset (S) into a logic element having a fan-in equal to a number of inputs to the slice.

12. The apparatus of claim 11, wherein the each of the plurality of interconnected logic elements are implemented by an associated lookup table.

13. A non-transitory computer readable medium containing program instructions for causing a computer to perform the method of:
generating at least one output from at least one input according to a secret that uses a white-box implementation of a randomized cryptographic function, the randomized cryptographic function obtained by at least one random operation performed on the whole of a nonrandomized function;
providing the randomized cryptographic function as a plurality of interconnected logic elements, the interconnection of the plurality of logic elements being comprised of non-algebraic interconnection of logic elements and algebraic interconnection of logic elements having obfuscated boundaries between at the least one input and output;
wherein the non-algebraic interconnected logic elements comprises a cyclic connection of at least a portion of the plurality of interconnected logic elements,
wherein the logic elements are Boolean circuit gates; and
wherein the randomized cryptographic function has fewer Boolean circuit gates than the whole of the nonrandomized function.

* * * * *